United States Patent [19]

Upshaw et al.

[11] 4,298,127
[45] Nov. 3, 1981

[54] STACKING BASKET ASSEMBLY

[75] Inventors: Clarence W. Upshaw, Tuttle; Richard A. Goodwin, Moore, both of Okla.

[73] Assignee: Unarco Industries, Inc., Chicago, Ill.

[21] Appl. No.: 63,199

[22] Filed: Aug. 3, 1979

[51] Int. Cl.³ .............................................. A47F 5/01
[52] U.S. Cl. ................................... 211/126; 206/513; 211/181; 220/19
[58] Field of Search ............... 211/126, 181, 128, 184; 220/19, 22.3; 206/513

[56] References Cited

U.S. PATENT DOCUMENTS

| | | | |
|---|---|---|---|
| 3,149,729 | 9/1964 | Smith | 211/126 X |
| 3,367,510 | 2/1968 | Krikorian | 211/126 |
| 3,388,808 | 6/1968 | Rodek | 211/181 X |
| 3,486,633 | 12/1969 | Wilson | 211/126 X |
| 3,606,025 | 9/1971 | Wilson | 211/126 |
| 4,079,836 | 3/1978 | Von Skin et al. | 211/126 X |

FOREIGN PATENT DOCUMENTS

| | | | |
|---|---|---|---|
| 800916 | 9/1958 | United Kingdom | 211/126 |
| 1197157 | 7/1970 | United Kingdom | 211/126 |

Primary Examiner—Ramon S. Britts
Assistant Examiner—Robert W. Gibson, Jr.
Attorney, Agent, or Firm—Clement and Ryan

[57] ABSTRACT

A stacking basket assembly utilizing a simplified basket construction. Each basket has a nestable base that is constructed of an array of interconnected wires into front, bottom and rear walls to provide strength, rigidity, and interlocking capabilities. Each of the baskets has removable end walls with camming ears that interlockingly and securely engage the base of the basket with minimal initial force. The end walls snap-fit into the base of the basket in a wedging action for improved stacking interlock and to avoid inadvertent disengagement.

18 Claims, 21 Drawing Figures

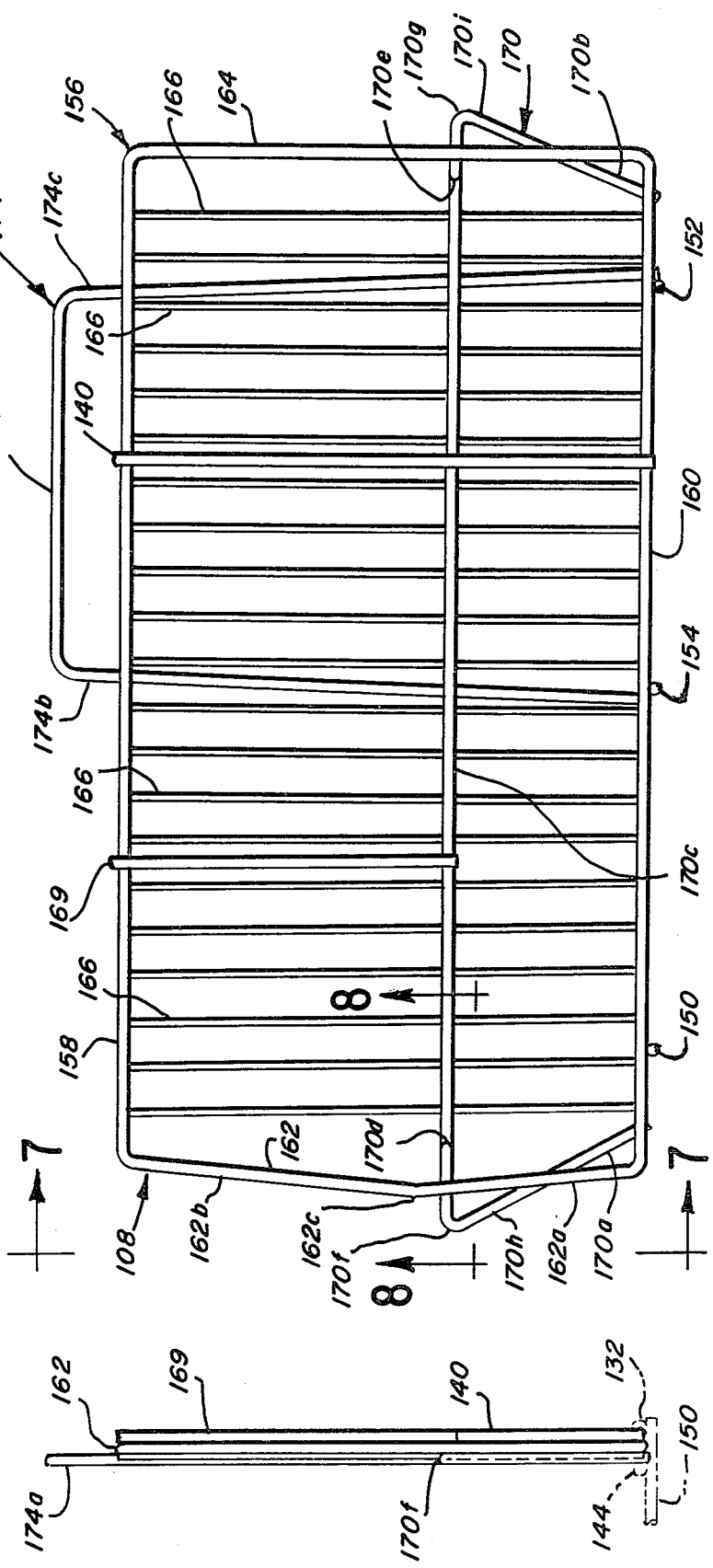

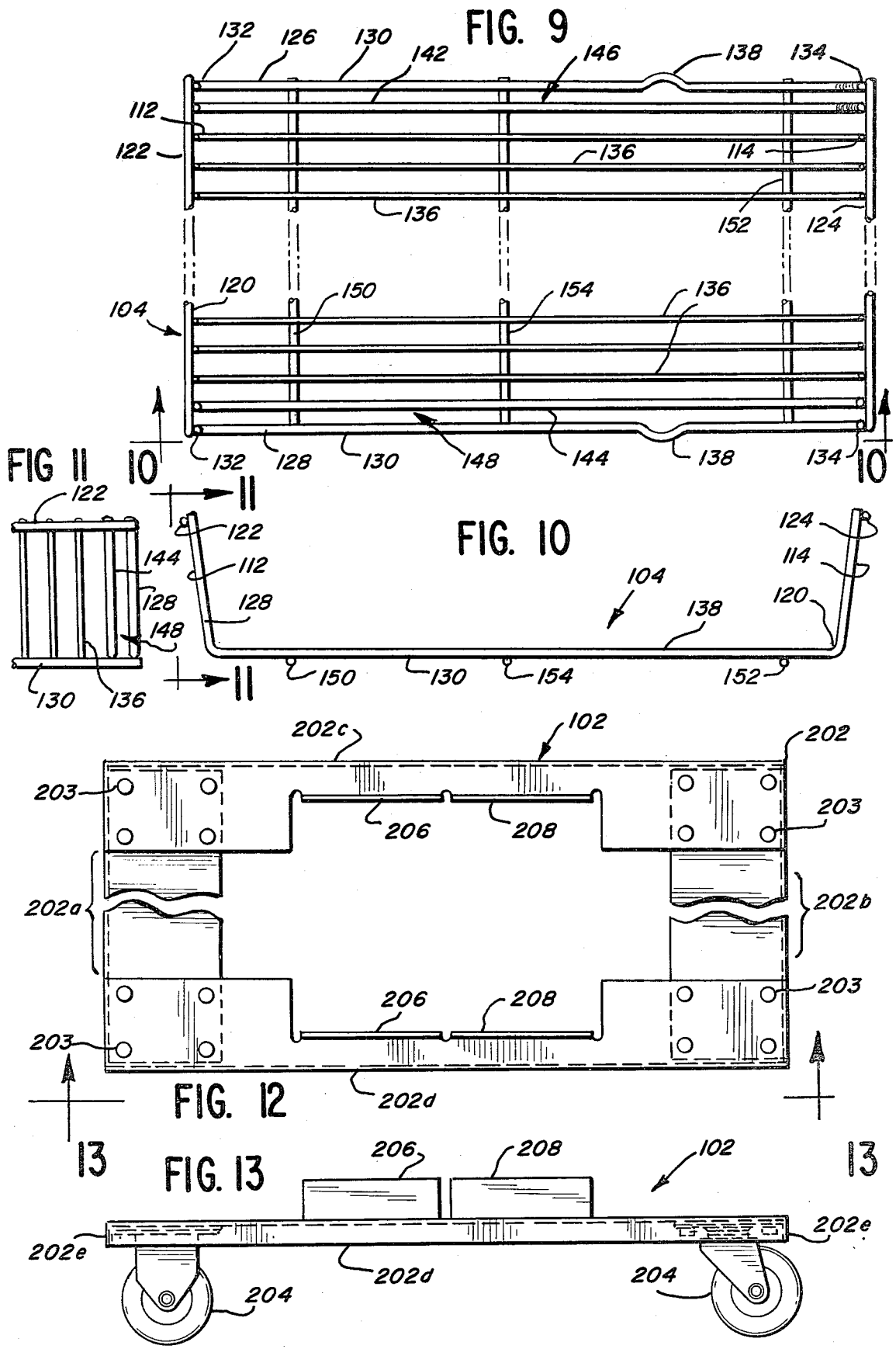

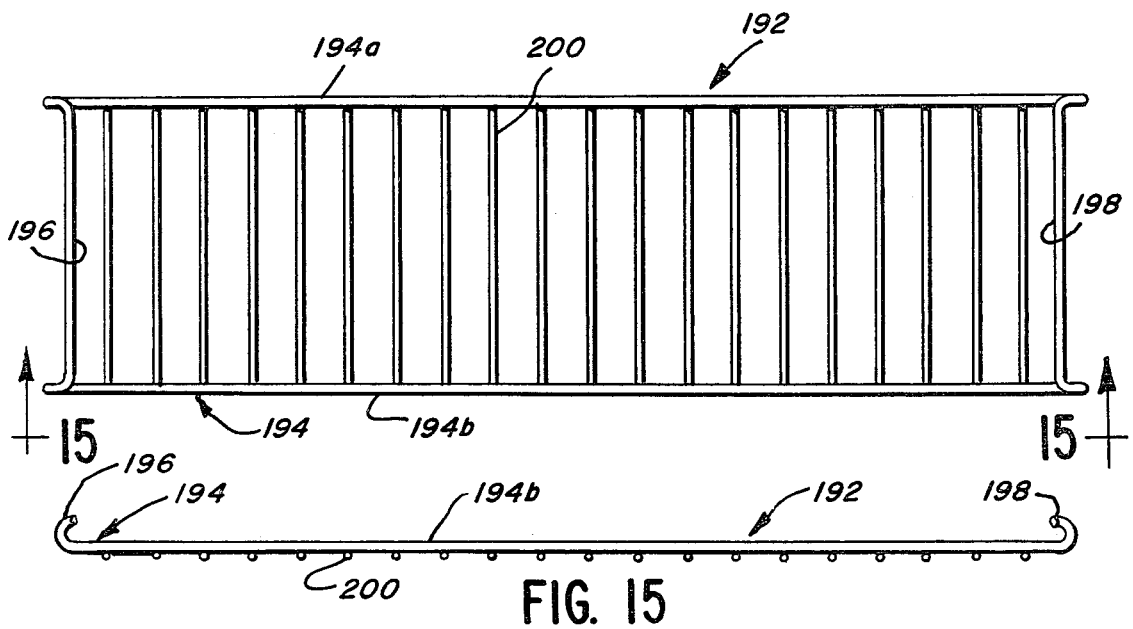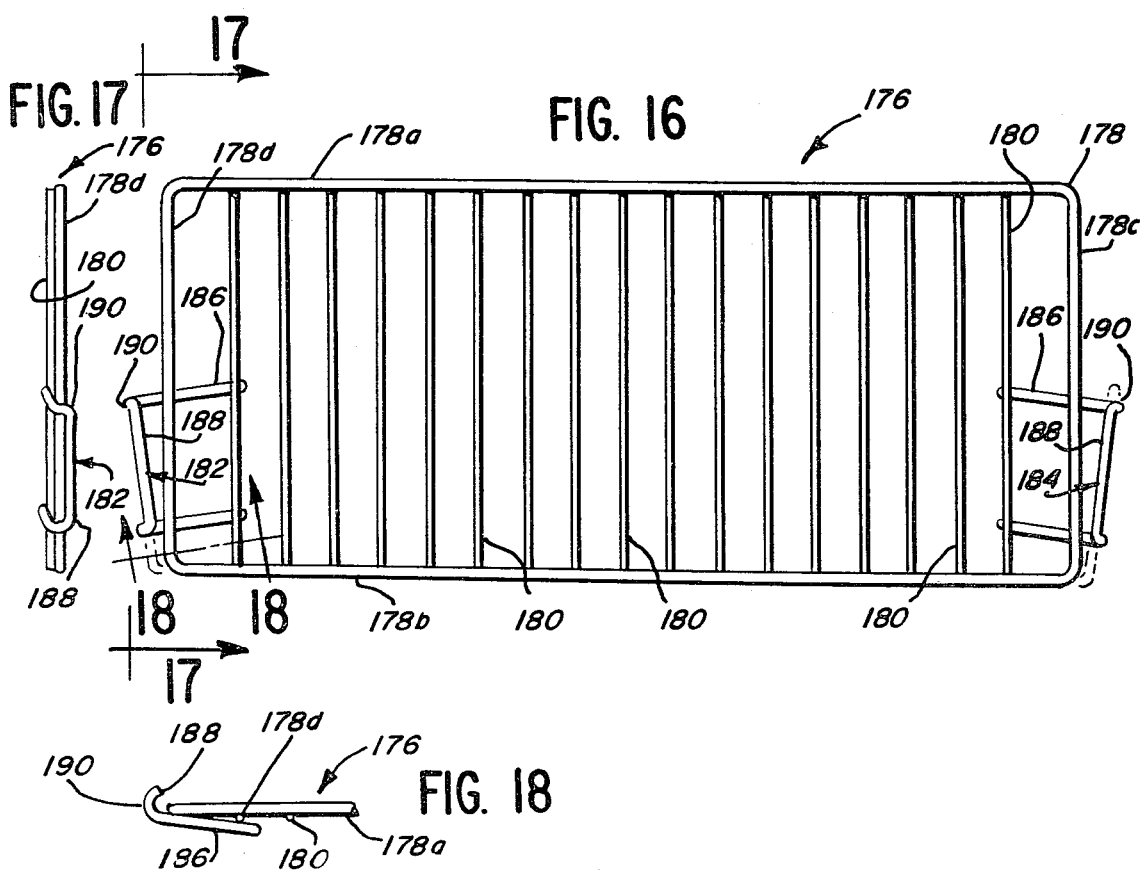

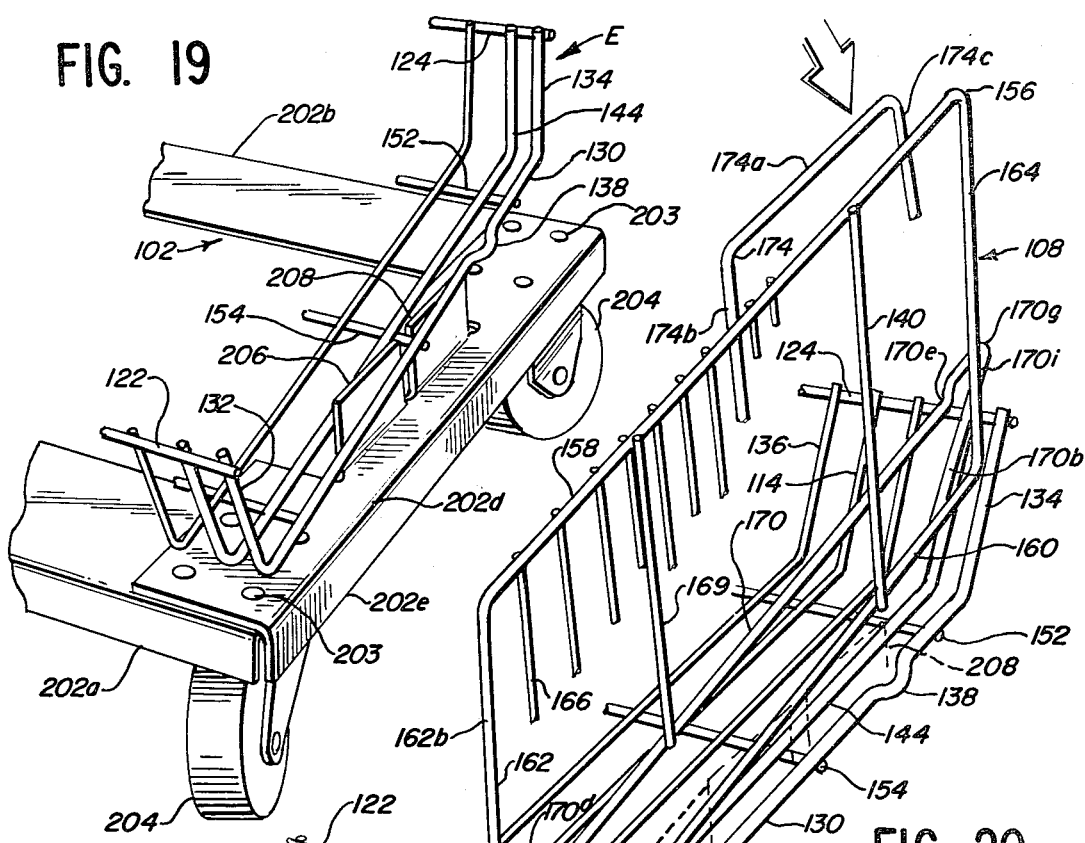
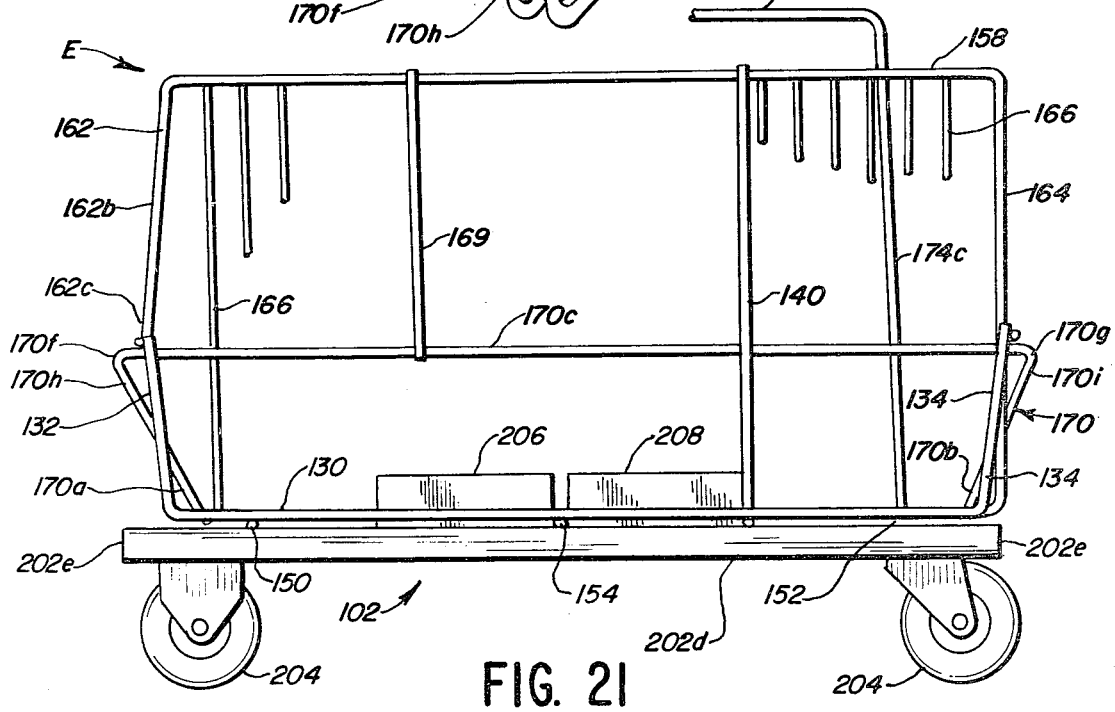

STACKING BASKET ASSEMBLY

BACKGROUND OF THE INVENTION

This invention relates to portable baskets and merchandising bins, and more particularly, to a basket assembly in which a plurality of baskets can be stacked upon each other for displaying merchandise and can be collapsed and nested within each other for storage.

Over the years a variety of stackable and/or nestable baskets, bins, trays and other containers have been developed, such as those shown in U.S. Pat. Nos. 2,931,535, 2,252,964, 2,554,232, 2,646,186, 2,662,662, 2,736,453, 3,211,326, 3,089,643, 3,409,163, 3,481,507, 3,061,025, 3,622,031 and 3,704,791.

Furthermore, over the years various baskets, bins, trays and other containers have been developed, some of which are stackable and/or nestable, others of which are not, with hinged end walls or endwise handles that pivot to a knockdown collapsed position. Typifying these baskets, bins, and containers are those shown in U.S. Pat. Nos. 2,985,332, 2,747,748, 3,523,694, 3,627,163, 3,762,593, 4,015,743, 4,106,626 and 4,113,131.

These prior art baskets, bins and containers have met with varying degrees of success.

One type of stackable and nestable basket which is particularly advantageous is known as the Vendall system and is shown and described in Von Stein et al. U.S. Pat. No. 4,079,836 assigned in Unarco Industries, Inc. The prior art Vendall system, however, only permits two baskets to be nested within each other at a time.

It is therefore desirable to provide an improved stacking and nesting basket assembly.

SUMMARY OF THE INVENTION

An improved basket assembly is provided with a plurality of stackable baskets that can be stacked upon a wheeled dolly for displaying groceries and other merchandise and which can be collapsed and nested within each other for compact storage.

Each of the baskets has a nestable base and removable end walls. Preferably the baskets are all of a similar construction. The base includes a bottom wall, a front wall and a rear wall, which are fixed relative to each other. Each of the removable end walls has connection means, which preferably takes the form of camming ears, to detachably connect the end walls to the front and rear walls. When the end walls are removed, the bases of the baskets can be nested within each other and the end walls can be stacked generally flat upon each other and placed upon the bottom wall of the uppermost nested base for compact storage.

In the preferred form, each of the end walls has an upright keying wire that engages an offset in the bottom wall to assure proper orientation of the end wall during assembly.

In order to provide aligned stacking, each end wall has a bail that extends upwardly to engage a slot formed in the bottom wall of the basket stacked upon it.

In the illustrative embodiment, each base and end wall is formed of an array of interconnected wires including a peripheral wire connected to and bounding a plurality of wire elements. The base and end walls each therefore define a foraminous barrier that substantially prevents ingress and egress of the goods therethrough.

Desirably, the front and rear walls of each basket are of a lesser height than the end walls to provide front and rear access openings into the lading-carrying space of the basket. In the illustrative embodiment, front and rear walls are substantially of the same height and diverge outwardly from the bottom wall to allow nesting and increase the loading-carrying space of the basket.

When desired, an auxiliary rear wall member can be used to increase the lading-carrying capacity of the basket. In the preferred form, the auxiliary wall member has a plurality of hooks that are detachably connected to the rearward portions of the end walls. The auxiliary rear wall member is located above and positioned closely adjacent the fixed rear wall and cooperates with the rear wall to provide a rearward barrier having a combined height greater than the front wall.

An optional divider can be used to separate the basket into a plurality of compartments. In the preferred form, the divider has a pair of hook-shaped ears that hook onto the front and rear walls.

When the baskets are stacked upon each other for displaying merchandise, they are preferably supported by a wheeled dolly. In the illustrative embodiment, the wheeled dolly has a pair of end frame members and side frame members that are positioned beneath the end walls and front and rear walls, respectively, of the baskets. Each of the end frame members of the dolly has a pair of upright flanges that fit into slots formed in the bottom wall of the base basket in a manner similar to the bails. The upright flanges of each end frame member are spaced apart from each other to define a pocket for receiving a longitudinal wire extending across the bottom wall of the base basket.

A more detailed explanation of the invention is provided in the following description and appended claims taken in conjunction with the accompanying drawings.

BRIEF DESCRIPTION OF THE DRAWINGS

FIG. 6 is a side view of a removable end wall of one of the baskets of FIG. 1;

FIG. 7 is an end view of the end wall of FIG. 6 taken substantially along line 7—7 of that figure;

FIG. 8 is a fragmentary cross-sectional view of a portion of the end wall of FIG. 6 taken substantially along line 8—8 of that figure;

FIG. 9 is a broken plan view of a nestable base of one of the baskets of FIG. 1;

FIG. 10 is an end view of the nestable base of FIG. 9 taken substantially along 10—10 of that figure;

FIG. 11 is a front view of a portion of the nestable base of FIG. 10 taken substantially along line 11—11 of that figure;

FIG. 12 is a broken plan view of portions of the dolly of FIG. 1 with no baskets stacked on the dolly;

FIG. 13 is a side view of the dolly of FIG. 12 taken substantially along line 13—13 of that figure;

FIG. 14 is a side view of an auxiliary wall member for use with one of the baskets of FIG. 1;

FIG. 15 is a bottom view of the auxiliary wall member of FIG. 14 taken substantially along line 15—15 of that figure;

FIG. 16 is a side view of a divider that can be used with the baskets of the present invention;

FIG. 17 is an end view of the divider of FIG. 16 taken substantially along line 17—17 of that figure;

FIG. 18 is a bottom view of a portion of the divider of FIG. 16, shown partly in cross-section, taken substantially along line 18—18 of FIG. 16;

FIG. 19 is a fragmentary, exploded perspective view of a portion of the dolly of FIG. 1 and a portion of the base of the bottommost basket of the basket assembly of FIG. 1;

FIG. 20 is an enlarged, exploded perspective view of portions of an end wall that is being wedgingly inserted into an end wall-receiving slot of the associated base member of one of the baskets of FIG. 1; and FIG. 21 is a side view of the dolly and portions of the bottommost basket of FIG. 1 after that basket has been seated upon the dolly.

DETAILED DESCRIPTION OF THE ILLUSTRATIVE EMBODIMENT

Basket Assembly

Figure 1:
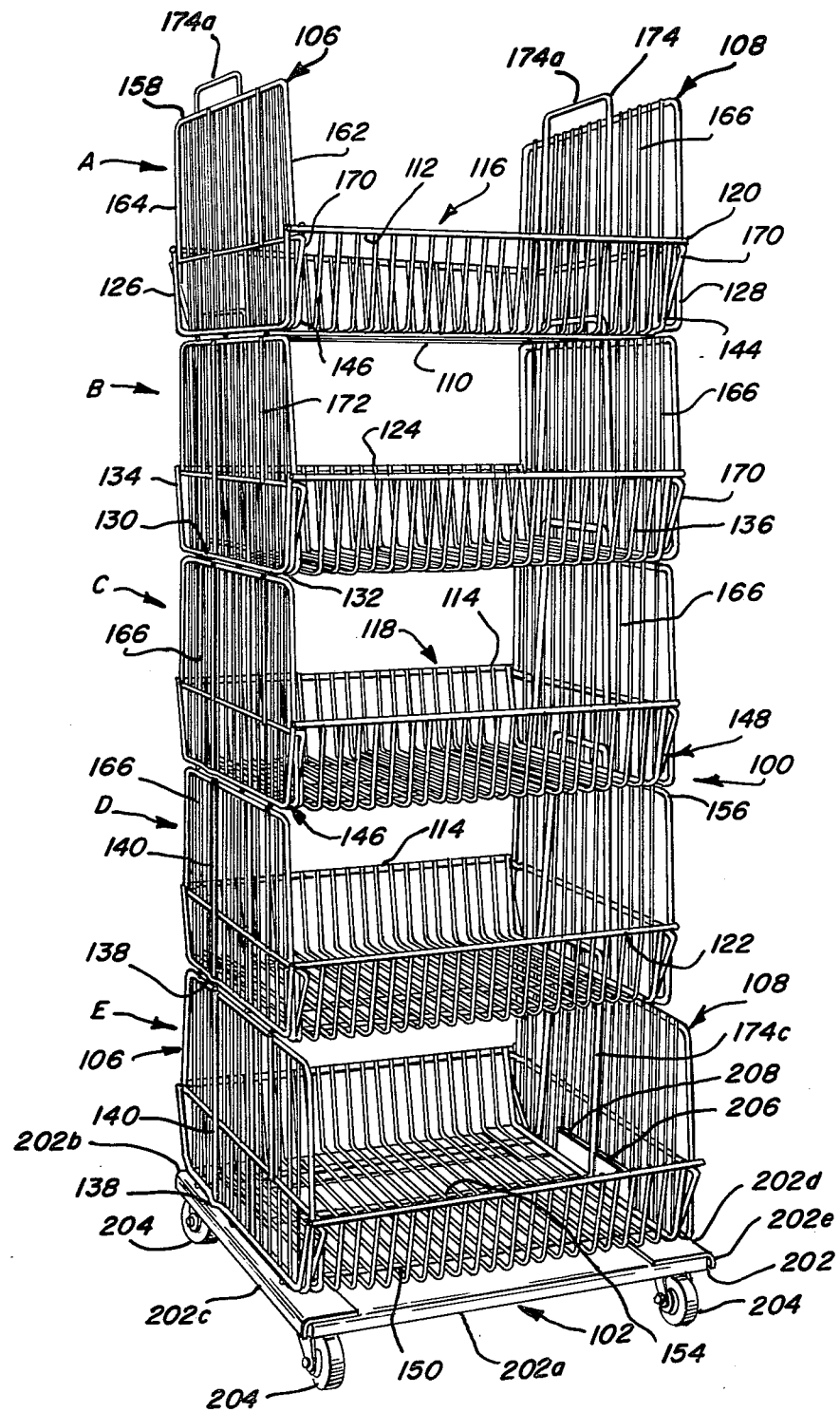
FIG. 1 is a perspective view of a basket assembly with baskets stacked upon each other and supported by a wheeled dolly for displaying groceries or other merchandise in a store in accordance with the principles of the present invention.

FIG. 1 of the drawings illustrates a portable stacking and nesting basket assembly 100 in which a plurality of similar wire baskets A, B, C, D and E, are stacked upon each other in a vertical tier or column to provide stackable merchandising bins or shelves for displaying groceries or other goods. The stacked baskets are supported and carried by a mobile wheeled dolly 102 for moving the stacked baskets to any location in a store. The interior of each basket defines a lading-carrying space for carrying the goods, which are confined by base 104 and end walls 106 and 108.

In the illustrative embodiment, each of the baskets A, B, C, D and E is structurally identical to the others. Each basket is formed of interconnected generally flexible, resilient wires, with the bottommost basket, base basket E, which sits upon and engages dolly 102, having a larger lading-carrying capacity than the baskets A, B, C and D stacked upon it. In the embodiment shown there are five baskets stacked upon each other. More or fewer baskets may be stacked upon each other as preferred. In some circumstances it may be desirable that the baskets be of different sizes.

Figure 2:
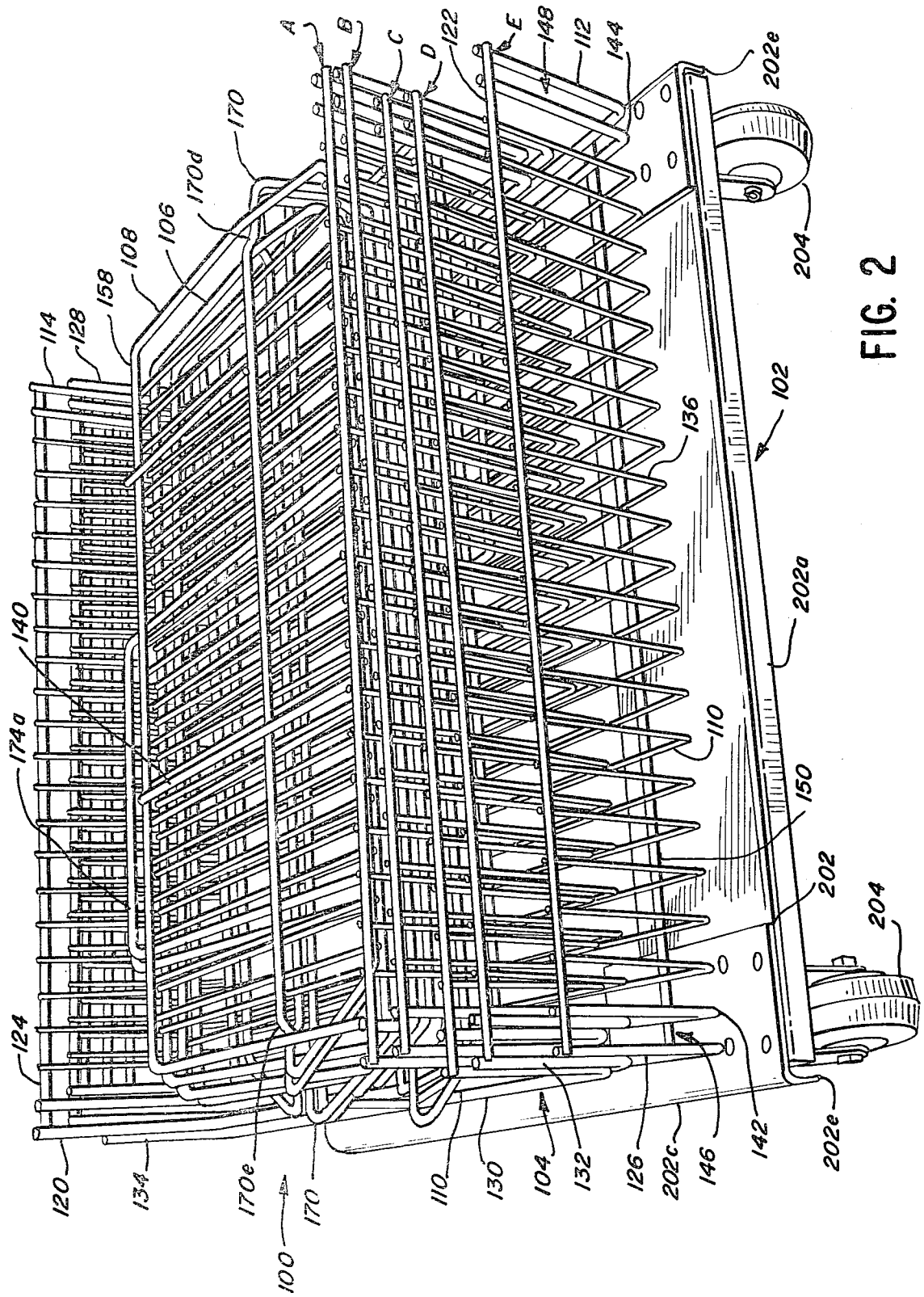
FIG. 2 is an enlarged perspective view of the basket assembly of FIG. 1 in a knock-down, collapsed and nested position.

The baskets can be readily knocked down, collapsed and nested for compact storage as shown in FIG. 2 by removing end walls 106 and 108 of the baskets and nesting bases 104 of the baskets within each other. The end walls can then be positioned (stacked) to lie generally flat upon each other as shown in FIG. 2 after they are rotated about 90 degrees and can be seated upon bottom wall 110 of the uppermost nested base 104 of upper basket A to minimize the storage space required. In the illustrative embodiment, nested bases 104 of the baskets are stored upon dolly 102. If desired, the baskets can be stored separately from the dolly.

Advantageously, baskets A, B, C, D and E can be readily assembled and disassembled without auxiliary fasteners or any special tools or hardware.

General Construction of Baskets

As best shown in FIGS. 1, 3, 9 and 10, nestable base 104 of each basket provides a formed mat or frame member having a generally flat rectangular bottom wall 110 and upstanding elongated walls 112 and 114 which form the front wall 112 and rear wall 114, respectively, of the basket. The mat is a one-piece unitary wire construction including peripheral base wire 120 and a plurality of parallel wire base 136 elements welded thereto. The mat when formed is generally flat and subsequently bent in a press to form the shape shown in the drawings with front and rear walls 112 and 114 diverging upwardly and outwardly from bottom wall 110 to enlarge the lading-carrying capacity of the basket and facilitate nesting. In the illustrative embodiment, each of the walls 112 and 114 is inclined, to slope upwardly and outwardly at an obtuse angle of inclination of about 97½ degrees relative to bottom wall 110.

Front and rear walls 112 and 114 are therefore integrally connected to bottom wall 110 so as to be permanently fixed and positioned stationary relative thereto, to prevent movement of the front, rear and bottom walls relative to each other. In the illustrative embodiment, front and rear walls 112 and 114 (FIG. 1) are each of a lower height than end walls 106 and 108 to provide front and rear access openings 116 and 118, respectively, into the interior lading-carrying space of the basket. The lower portions of front and rear walls 112 and 114 each provide a barrier at a location adjacent bottom wall 110 to substantially prevent goods carried in the basket from being removed adjacent that location and to permit the goods to be removed only through access openings 116 and 118. In the illustrative embodiment, front and rear walls 112 and 114 of each basket are of the same height so as to be equally accessible from either the front or back.

Figure 3:
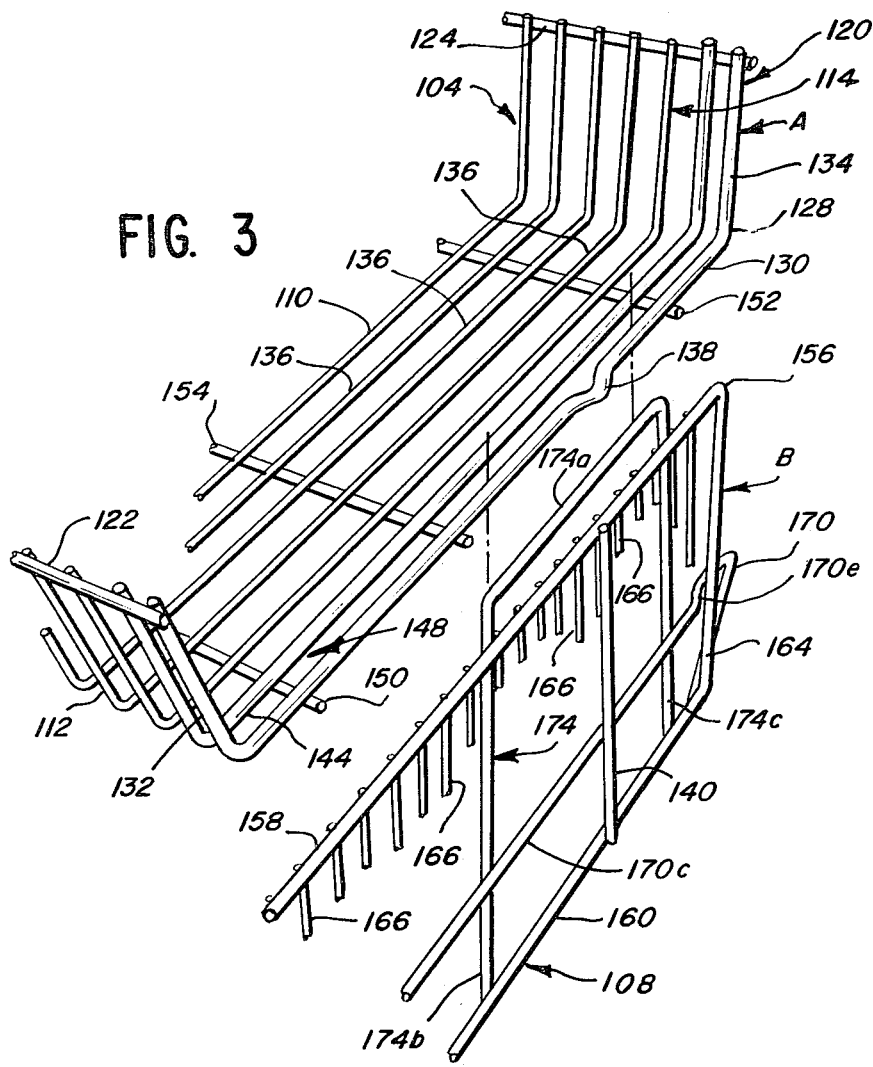
FIG. 3 is an enlarged, exploded perspective view of a portion of an end wall of one of the baskets of FIG. 1 aligned in registration with an end wall-receiving slot of a portion of the base of another basket positioned thereabove, preparatory to stacking of the baskets.
Figure 4:
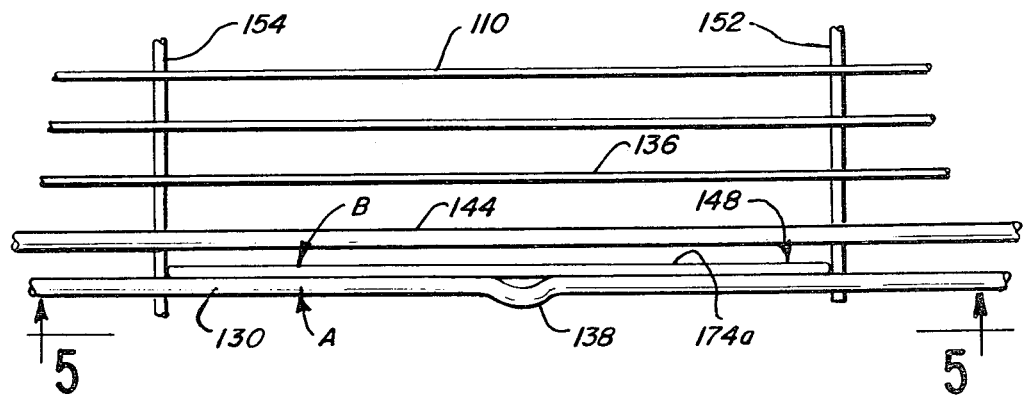
FIG. 4 is a further enlarged plan view of portions of the two baskets shown in FIG. 3 after the baskets have been stacked upon one another.
Figure 5:
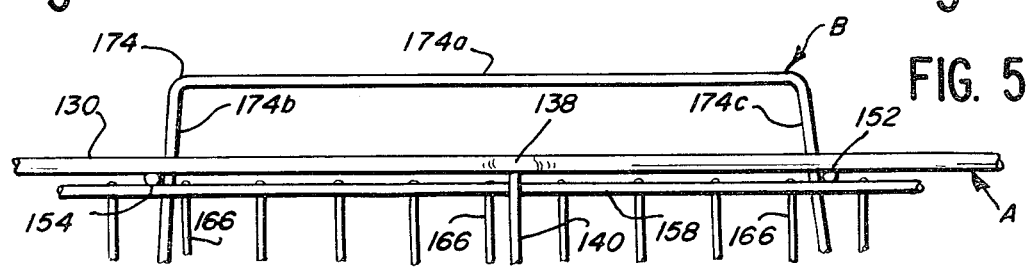
FIG. 5 is a fragmentary end view of the two stacked baskets of FIG. 4 taken substantially along line 5—5 of that figure.

As shown in FIGS. 3 and 9, peripheral base wire 120 of each base 104 includes a front elongated rail or horizontal runner 122 that extends along and defines the upper edge of front wall 112, a rear elongated rail or horizontal runner 124 that extends along and defines the upper edge of the rear wall 114, and a pair of generally U-shaped end rails 126 and 128 which extend between and are welded to the inner surfaces of the ends of the front and rear rails 122 and 124. Each U-shaped end rail 126 and 128 has a bottom horizontal portion 130 that extends between front and rear walls 112 and 114 to provide one of the ends of bottom wall 110, and has upstanding front and rear portions 132 and 134 to provide one of the ends of front and rear walls 112 and 114, respectively.

Wire base elements 136 are welded to the inner surfaces of front and rear rails 122 and 124 and are spaced from each other in parallel relationship with U-shaped end rails 126 and 128 at generally equal intervals to prevent passage of the goods through the area bounded by peripheral base wire 120. Wire base elements 136 therefore provide a wall-like wire barrier across the front, bottom and rear of base 104 to confine the goods carried in the basket and to substantially prevent access therethrough into the lading-carrying space of the basket. In the illustrative embodiment, wire base elements 136 are of a smaller gauge size and diameter than peripheral base wire 120, and each of the U-shaped end rails 126 and 128 has a slightly larger gauge size and diameter than front and rear rails 122 and 124.

In order to properly orient end walls 106 and 108 during assembly, bottom horizontal portion 130 of each U-shaped end rail 126 and 128 (FIGS. 9 and 20) is bent slightly outwardly to provide an offset or outward projection 138. Each offset 138 snap-fittingly receives and is keyed to an upright keying wire 140 of the end wall to which it is connected. Keying wire 140 extends slightly below its associated end wall. In the illustrative embodiment, offset 138 is located closer to rear wall 114 than to front wall 112.

In order to define end wall-receiving slots 146 and 148 (best seen in FIGS. 1, 3 and 11) along base 104, inward U-shaped rails 142 and 144 (best seen in FIGS. 3, 9 and 10) are spaced inward of but adjacent their associated U-shaped end rails 126 and 128, respectively. Inward U-shaped rails 142 and 144 are substantially similar to U-shaped end rails 126 and 128, except that they do not have an offset portion.

Along the underside of bottom wall 110 of each base 104 are welded three longitudinal wires: a forward longitudinal wire 150 that is positioned adjacent front wall 112, a rearward longitudinal wire 152 that is positioned adjacent the rear wall 114, and an intermediate longitudinal wire 154 that is positioned intermediate forward and rearward wires 150 and 152 (FIGS. 3 and 9). Intermediate wire 154 is positioned forwardly of offset portion 138 of bottom portion 130 of each end rail 126 and 128. Advantageously, intermediate wire 154 of base basket E cooperates with dolly 102 to provide for stable stacking as is explained in greater detail below. In the illustrative embodiment, wires 150, 152 and 154 are spaced parallel to respectively, and are of a similar gauge size and diameter as front and rear rails 122 and 124. When smaller baskets are used, such as a basket with a sixteen inch span between rails 122 and 124, wire 150 need not be included.

Removable End Walls

Referring now to removable end walls 106 and 108 (FIG. 1) of each basket, these walls are symmetrical mirror-images of each other as are front and rear walls 112 and 114. As best shown in FIG. 6, each end wall has a generally rectangular unitary peripheral end wire 156. Peripheral end wire 156 has a top horizontal rail portion 158 which runs across and generally defines the top of the end wall, a bottom horizontal rail portion 160 that extends across and defines the bottom of the end wall and front and rear upright portions 162 and 164, respectively, that extend between and connect top and bottom horizontal rail portions 158 and 160 to define the front and rear edges of the end wall. Rear rail 164 is substantially vertical. Front rail 162 has a lower portion 162a that is inclined slightly upwardly and outwardly from bottom rail 160, and an elongated upper portion 162b that is inclined outwardly and downwardly from top rail 158 and is connected to lower portion 162a at apex 162c. In the embodiment shown, upper portion 162b is longer than lower portion 162a.

Each end wall 106 and 108 has a plurality of parallel vertical wire elements 166 (FIGS. 1 and 6), welded at uniform intervals along the inner surfaces of top and bottom horizontal rails 158 and 160. Vertical wire elements 166 provide a wire wall-like endwise barrier across the end wall to prevent passage of goods through the area bounded by peripheral end wire 156. The wall-like barrier confines the goods endwise in the basket and substantially prevents access therethrough into the lading-carrying space of the basket.

In the illustrative embodiment, each end wall 106 and 108 has a vertical front brace 169 (FIG. 6) to rigidify the end wall. Brace 169 is connected to the outer surfaces of top rail 158 and crosswise rail 170c (described below). It is located closer to front wall 112 than to rear wall 114. In some circumstances, such as when smaller baskets are used, the front brace 169 may be omitted for economy of material.

Wedgable Camming Ears

In order to detachably connect each end wall 106 and 108 to the base 104 of the basket in an erect position, each end wall has a connecting wire 170 (FIG. 6) that provides laterally opposed front and rear wedgable camming ears 170h and 170i at a location slightly below apex 162c. Connecting wire 170 has inclined front and rear portions 170a and 170b welded to the inner surfaces of bottom rail portion 160 and upright rail portions 162 and 164, respectively, and has a horizontal crosswise portion 170c that extends across and is welded to the outer surfaces of vertical wire elements 166. The bottom of each inclined portion 170a and 170b extends slightly below bottom horizontal rail portion 160. In the illustrative embodiment, each inclined portion 170a and 170b is sloped at an angle of inclination of about 155 degrees relative to bottom horizontal rail portion 160. The ends 170d and 170e (FIGS. 6 and 8) of horizontal portion 170c are bent inwardly and offset. The outer surface of offset ends 170d and 170e are welded to the inner surfaces of upright rails 162 and 164, respectively, at a location slightly below apex 162c.

Offset ends 170d and 170e extend outwardly of upright rails 162 and 164 to form rounded wedgable corners or bights 170f and 170g with inclined portions 170a and 170b, respectively.

Camming ears 170h and 170i are formed by the portions of connecting wire 170 that extend laterally outward of peripheral wire 156. Each of the camming ears 170h and 170i is triangular in shape. The gauge size and diameter of connecting wire 170 is about the same as peripheral end wire 156.

In order to accommodate snap-fitting interlocking and wedging engagement between the detachable end wall 108, for example, and base 104, the width of at least a portion of end wall-receiving slot 148 (FIGS. 1, 3 and 11) is slightly less than the combined diameters of camming ear 170h or 170i, respectively, and peripheral end wire 156 of its associated end wall, so that the outer surfaces of the end wall's upright rails 162 and 164 abut against the inner surface of the base's adjacent end rail 128, and inner surfaces of the camming ears 170h and 170i abut against the outer surfaces of the base's adjacent inward U-shaped rail 144. This is best seen in FIG. 20.

Keying Wire

Referring now to the upright keying wire 140 of each end wall 106 and 108, upright keying wire 140 (FIGS. 3 and 6) extends from a position slightly above top rail 158 to a position slightly below bottom rail 160, and is welded to the outer surfaces of the top, bottom and crosswise rails 158, 160 and 170c. In the illustrative embodiment, keying wire 140 has a gauge size and diameter similar to peripheral end wire 156 and is located generally near the middle of stacking bail 174a, to be described below.

During assembly of the basket of this invention, keying wire 140 is keyed with offset 138 in horizontal portion 130 of each U-shaped end rail 126 and 128 to prevent the end walls from being assembled backwards, and to assure that the end walls are rigidly secured in a substantially vertical position. The keying wire and offset therefore cooperate to guide and position the end wall to substantially prevent the end wall from tilting. Each keying wire 140 and associated offset 138 also serve to properly align the respective left and right-hand end walls 106 and 108 (FIG. 1) of the baskets in a vertical array to assure aligned and stable stacking.

Stacking Bails

In order to accommodate stable and secure stacking, each end wall 106 and 108 has an inverted U-shaped stacking member 174 (FIGS. 1, 3 and 6) that provides an upright stacking bail 174a and downwardly diverging legs 174b and 174c. Legs 174b and 174c are welded to the inner surfaces of the top, crosswise and bottom rails 158, 170c and 160 and extend slightly below bottom rail 160. Stacking bail 174a is formed from the bight of inverted U-shaped stacking member 174 and extends vertically above top rail 158. Bail 174a is positioned closer to rear wall 114 than to front wall 112. In the illustrative embodiment, bail 174a spans about 3/5 the length of top rail 158 and stacking member 174 is of a similar gauge size and diameter as peripheral end wire 156.

As shown in FIGS. 1 and 3-5, during stacking, bails 174a of end walls 106 and 108 serve as "male" inserting members to enter into, snap-fit and interlockingly engage the end wall-receiving slots 146 and 148 of the base 104 of the basket stacked upon it, so that bails 174a of basket B engage end wall-receiving slots 146 and 148 of basket A, bails 174a of basket C engage end wall-receiving slots 146 and 148 of basket B, etc. When the baskets are properly stacked, longitudinal wires 150, 152 and 154 (FIGS. 3 and 5) of one basket, such as basket A, should sit upon and engage the top rail 158 of the basket, such as basket B, stacked directly below it. In order to provide for snap-fitting engagement between bails 174a and bail-receiving slots 146 or 148, the spacing between the inward U-shaped rail 142 or 144 and the vertical wire elements 166 of one basket below it, such as basket A, is slightly less than the diameter of bail 174a of the basket below it, such as basket B, as viewed in top plan view, so that the outer surfaces of bail 174a abut against the inner surfaces of the upper basket's vertical wire elements 166, and the inner surfaces of the bail 174a abut against the outer surfaces of the bottom of the upper basket's adjacent inward U-shaped rail 142 or 144 when the baskets are fully stacked and seated. This arrangement provides for a very secure, rigid and stable tier of stacked baskets A, B, C, D and E.

Divider

As shown in FIGS. 16-18, a divider or partition 176 can be used in each basket to separate the basket into a plurality of compartments. Divider 176 hooks onto the front and rear walls 112 and 114 of the basket and can be removed when not in use. Divider 176 has a generally rectangular peripheral partition wire 178 and vertical parallel wire divider elements 180 that are welded at equal intervals to the top and bottom horizontal portions 178a and 178b of the peripheral wire 178 so as to be parallel to the upright rail portions 178c and 178d of peripheral wire 178. Vertical wire elements are of a smaller gauge size and diameter than peripheral wire 178.

A pair of laterally opposed C-shaped connecting portions 182 and 184 are welded to the rear and front upright portions 178c and 178d, respectively, of peripheral wire 178 and the wire element 180 adjacent thereto. Each connecting portion 182 and 184 has a C-shaped section 186 that extends laterally outwardly of upright portion 178c and 178d and has a rounded inclined hook 188 with rounded corners or noses 190. Hooks 188 are inclined at an obtuse angle of inclination, such as 100 degrees, relative to the bottom horizontal portion 178b of peripheral wire 178. The hooks 188 do not extend to the bottom of the basket.

Auxiliary Rear Wall

An optional auxiliary rear wall member 192 can be used as shown in FIGS. 14 and 15 to increase the lading-carrying capacity of the basket. Auxiliary rear wall member 192 has a peripheral rear wire 194 with longitudinally opposed vertical hooks 196 and 198 that hook upon the end walls 106 and 108 of the basket. Each hook is curved and bent inwardly and provides one of the ends of peripheral wire 194. Hooks 196 and 198 extend between top and bottom horizontal portions 194a and 194b of peripheral wire 194. A plurality of parallel vertical wire elements 200 are spaced at equal intervals along peripheral wire 194 and are welded to top and bottom horizontal portions 194a and 194b.

Wire elements 200 provide an auxiliary rear barrier to confine the good rearwardly in the basket and substantially prevent access therethrough into the lading-carrying space of the basket. The barrier substantially prevents the goods carried in the basket from passing through the area bounded by the peripheral rear wire 194.

When installed, bottom horizontal portion 194b of auxiliary wall member 192 is positioned closely adjacent and above rail 124 of rear wall 114 and preferably engages rail 124. Auxiliary wall member 192 and rear wall 114 cooperate with each other to provide a rear barrier having a combined height greater than front wall 112. Auxiliary wall member 192 can be removed from the basket when not used, by unhooking the hooks 196 and 198 from end walls 106 and 108.

Base Basket

As discussed earlier, base basket E (FIG. 1) is seated upon wheeled dolly 102 and is of a larger size and capacity than, but otherwise identical to, baskets A, B, C and D stacked upon it. When the baskets A, B, C, D and E are stacked as shown, the rear walls 114 of the baskets are in general vertical alignment with each other, the left-hand end walls 106 and left-hand bails 174a of are in general vertical alignment with each other, and the right-hand end walls 108 and right-hand bails 174a of the other end of the baskets are in general vertical alignment with each other. When stacked, the front walls 112 of the top four baskets A, B, C and D are in general vertical align- ment with each other and the front wall 112 of the base basket E is positioned forwardly of the front walls 112 of the other baskets A, B, C and D. The forward longitudinal wire 150 of the base basket E is also positioned forwardly of the forward longitudinal wires 150 of the other baskets A, B, C and D.

Dolly

As shown in FIGS. 1, 2, 12, 13, 19 and 21, the wheeled dolly 102 has a generally rectangular frame assembly 202 and four casters or wheels 204 which are bolted to the underside of frame assembly 202. Frame assembly 202 has front and rear longitudinal frame members 202a and 202b and a pair of end frame members 202c and 202d that extend between and are bolted to front and rear frame members 202a and 202b. In the illustrative embodiment, end frame members 202c and 202d are positioned upon the top surfaces of front and rear members 202a and 202b. The bolts 203 that connect frame members 202a, 202b, 202c and 202d together also secure casters 204 to the bottom of frame assembly 202. The outer edge of each frame member 202a, 202b, 202c and 202d is bent downwardly to provide a peripheral flange 202e.

The inwardly facing middle portion of each end frame member 202c and 202d is bent upwardly to provide a pair of upright flanges 206 and 208 for snap-fitting interlocking engagement into one of the end wall-receiving slots 146 or 146 of base basket E in a manner similar to the bails 174a in order to provide a secure stacking connection between dolly 102 and base basket E. The front upright flange 206 is positioned forwardly of the vertically aligned bails 174a above it. Upright flanges 206 and 208 are spaced apart from each other to define a pocket that interlockingly receives the intermediate longitudinal wire 154 extending along the bottom wall 110 of base basket E to enhance the stability of stacked basket assembly 100.

Procedure for Stacking Baskets Upon the Dolly

In order to assemble the stacking basket assembly 100 as shown in FIG. 1, the base 104 of base basket E (FIGS. 19 and 20) should first be placed onto dolly 202 so that the flanges 206 and 208 of dolly 102 enter end wall-receiving slots 146 and 148 of base 104 of basket E. Thereafter each end wall 106 and 108 of base basket E is sequentially connected to base 104 of basket E, with the flanges 206 and 208 positioned inward (inside) of end walls 106 and 108, by pushing the inclined wedging surfaces of wedgable camming ears 170h and 170i against the front and rear rails 122 and 124 of base 104 with sufficient force to wedge front and rear walls 112 and 114 of basket E outwardly to permit the camming ears and bottom rail 160 to enter associated end wall-receiving slot 146 or 148 of base 104. When the end wall is attached and seated in base 104, front and rear walls 112 and 114 return to their normal inwardly biased position as shown in FIG. 20. Downward force on end wall 106 or 108 will also cause keying wire 140 to engage offset 138 of base 104.

If they are to be used, auxiliary rear wall member 192 (FIGS. 14 and 15) and divider 176 (FIGS. 16 and 17) should be installed before the next basket D is stacked upon basket E.

Thereafter, base 104 of next basket D is stacked upon basket E so that bails 174a of basket E enter end wall-receiving slots 146 and 148 of base 104 of basket D, and bottom rail 130 of basket D rests upon and engages top rail 158 of basket E. End walls 106 and 108 of basket D are then connected to base 104 of basket D in a manner similar to the procedure described above with respect to basket E. This procedure should then be repeated until all the baskets A, B, C, D and E are stacked upon each other as shown in FIG. 1.

In order to disassemble stacking basket assembly 100, the above procedure should be reversed.

Advantages of this Invention

Among the many advantages of the stacking basket assembly of this invention are mobility, versatility, flexibility, improved knockdown and assembly, and a new modular construction. The mobility of the stacking basket assembly allows backroom stocking and intermittent placement and maneuverability of the assembly for maximum floor utilization. The versatility and flexibility of the assembly permits numerous types of merchandise to be displayed in the baskets and enhances mass merchandising capability. It also permits shopping accessibility from both sides of the baskets and their use as shelves and island displays. As explained previously, each of the baskets can be compartmentalized with use of the dividers 176 (FIG. 16) for product mixing and separation.

The knockdown and setup advantages of the stacking basket assembly permit the assembly to be assembed or knocked down, collapsed and nested without the use of any tools.

The modular construction of the assembly is characterized by identical stack mechanisms (bails) that provide interchangeability and stacking of the baskets on the dolly. No special base basket is required inasmuch as the base basket is constructed similar to the other baskets. The stacking baskets have fewer parts and components and provide greater tier flexibility than many prior art systems. The modular construction also provides tier unit packaging for in-store convenience and reduced shipping cost.

The above detailed description has been given for ease of understanding only. No unnecessary limitations are to be understood therefrom, as modifications will be obvious to those skilled in the art.

What is claimed is:

1. A basket assembly which comprises a plurality of wire baskets, each of said baskets having a plurality of wire walls defining a lading-carrying space, said walls including a bottom wall and removable end walls, each of said walls having an array of interconnected wires including a plurality of wire elements and a peripheral wire connected to and bounding said wire elements, and each of said walls defining a foraminous barrier for substantially preventing access therethrough into the lading-carrying space of said basket and confining goods carried in said basket, said barrier substantially preventing said goods from passing through the area bounded by said peripheral wire, each of said baskets having connecting means comprising a pair of laterally opposed camming ears extending outwardly of each of said end walls for detachably connecting said removable end walls to said basket in an erect position, said end walls of each basket being removable for permitting the bottom walls of said wire baskets to be nested within each other with said removed walls lying upon the bottom wall of the uppermost nested basket during storage, and each of said wire baskets including stacking means for stacking the wire baskets upon each other in a substantially vertical tier when the end walls are connected to the baskets in the erect position.

2. A basket assembly in accordance with claim 1 wherein said stacking means includes a bail extending upwardly above said peripheral wire of each end wall and a slot defined in said bottom wall adjacent each end wall of the basket for receiving with a snap fit the bail of the basket stacked below said first mentioned basket.

3. A basket assembly in accordance with claim 1 which includes a keying wire extending slightly below said peripheral wire of each end wall, and wherein said peripheral wire of said bottom wall includes an offset portion adjacent each end wall for receiving said keying wire.

4. A basket assembly which comprises a plurality of baskets, each basket having a base including a bottom wall, a front wall and a rear wall, said front and rear walls being permanently fixed and positioned stationary relative to said bottom wall for substantially preventing movement of said front and rear walls relative to said bottom wall, a pair of removable end walls extending between said front and rear walls, connecting means comprising a pair of laterally opposed camming ears extending outwardly of each said removable end walls for detachably connecting said removable end walls to said front and rear wall, said end walls being removable from said basket for permitting said bases of the baskets to be nested within each other with said removed walls lying generally flat upon each other and upon the bottom wall of the uppermost nested base during storage.

5. A basket assembly in accordance with claim 4 wherein said front and rear walls each provide a barrier at a location adjacent said bottom wall for substantially preventing goods carried in said basket from being removed from said location.

6. A basket assembly in accordance with claim 4 wherein said front and rear walls are each of a lesser height than said end walls to provide front and rear access openings into the lading-carrying space of said basket.

7. A basket assembly in accordance with claim 6 wherein said front and rear walls are of substantially equal height.

8. A basket assembly in accordance with claim 7 which includes an auxiliary wall member having a plurality of hooks for detachable connection to said removable end walls, said auxiliary wall member being located above and positioned closely adjacent said rear wall, said auxiliary member connecting with said rear wall to provide a rear barrier having a combined height greater than said front wall to increase the lading-carrying capacity of the basket.

9. A basket assembly in accordance with claim 4 wherein each of said laterally opposed camming ears is permanently affixed to its associated end wall, and each of said front and rear walls defines a slot adjacent each end wall for receiving one of said camming ears.

10. A basket assembly in accordance with claim 4 wherein each end wall of said basket includes a keying wire extending downwardly therefrom, and wherein said bottom wall includes an offset portion adjacent each end wall for receiving said downwardly extending keying wire.

11. A basket assembly which comprises a plurality of baskets, each basket having a base including a bottom wall, a front wall and a rear wall, said front and rear walls diverging upwardly and outwardly from said bottom wall for increasing the lading-carrying space of said basket and being permanently fixed to and positioned stationary relative to said bottom wall for substantially preventing movement of said front and rear walls relative to said bottom wall, a pair of removable end walls extending between said front and rear walls, said front and rear walls each defining a slot adjacent said end wall, said bottom wall defining a bail-receiving slot and an offset portion adjacent each end wall, each of said end walls having a pair of laterally opposed camming ears for detachable snap-fitting interlocking engagement with the slots of said front and rear walls to detachably connect said removable end wall to said front and rear walls, each of said removable end walls having a keying wire extending downwardly for detachable interlocking engagement with said offset portion in the bottom wall for assuring proper orientation of said end walls, and each of said end walls of said basket having a substantially vertical bail extending above each end wall for detachable snap-fitting interlocking engagement with said bail-receiving slot of the bottom of the basket stacked upon it to enable said baskets to be rigidly stacked upon each other, and said end walls of each basket being removable for permitting the bases of the basket to be nested within each other with said removed walls lying generally flat upon each other and upon the bottom wall of the uppermost nested base for compact storage.

12. A basket assembly in accordance with claim 1 wherein each basket includes a divider for separating said basket into a plurality of compartments, each divider having a pair of laterally opposed hooks for hookingly engaging said front and rear walls to detachably connect said divider to said base.

13. A basket assembly in accordance with claim 11 wherein said baskets include a base basket stacked below said other baskets, said base basket being structurally similar to said other baskets but having a greater lading-carrying capacity.

14. A basket assembly in accordance with claim 13 wherein:
the bottom wall of said base basket includes a longitudinal wire extending between said removable end walls, and
said basket assembly includes a wheeled dolly having a pair of end frame members positioned below said end walls of said base basket, each of said end frame members carrying a pair of upright flanges for detachable interlocking engagement with said bail-receiving slot in the bottom wall of the base basket, said flanges being spaced from each other to define a pocket for receiving said longitudinal wire of said bottom wall of the base basket.

15. A basket assembly in accordance with claim 14 wherein:
said dolly includes front and rear frame members extending between and connecting said end frame members of the dolly;
the rear walls of said baskets are in general vertical alignment with each other,
the end walls and bails of one end of all the baskets of the assembly are in general vertical alignment with each other, and
the end walls and bails of the other end of all the baskets of the assembly are in general vertical alignment with each other,
said front wall of said base basket is positioned forwardly of the front walls of the other baskets of the assembly, and
one of said flanges of the pair of flanges carried by each of said end frame members of said dolly is positioned forwardly of said vertically aligned bails of said base basket and said pocket defined by each of said pairs of flanges is centered generally midway between said front and rear frame members of the dolly for enhancing the stability of the stacked basket assembly.

16. A basket assembly in accordance with claim 11 wherein said front and rear walls of each basket are each of a lower height than said end walls to provide front and rear access openings into the lading-carrying space of said basket.

17. A basket assembly in accordance with claim 11 wherein each basket includes an auxiliary wall member having a plurality of hooks for detachable connection to said removable end walls, said auxiliary wall member being located above and positioned closely adjacent said rear wall, said auxiliary member connecting with said rear wall to provide a rear barrier having a combined height greater than said front wall to increase the lading-carrying capacity of the basket.

18. A basket assembly in accordance with claim 11 wherein said front and rear walls of each basket are generally of the same height so said basket is equally accessible from both the front and rear.

* * * * *